Apr. 24, 1923. 1,453,061
E. BRUNDIGE
VEHICLE SPRING
Filed Feb. 2, 1922
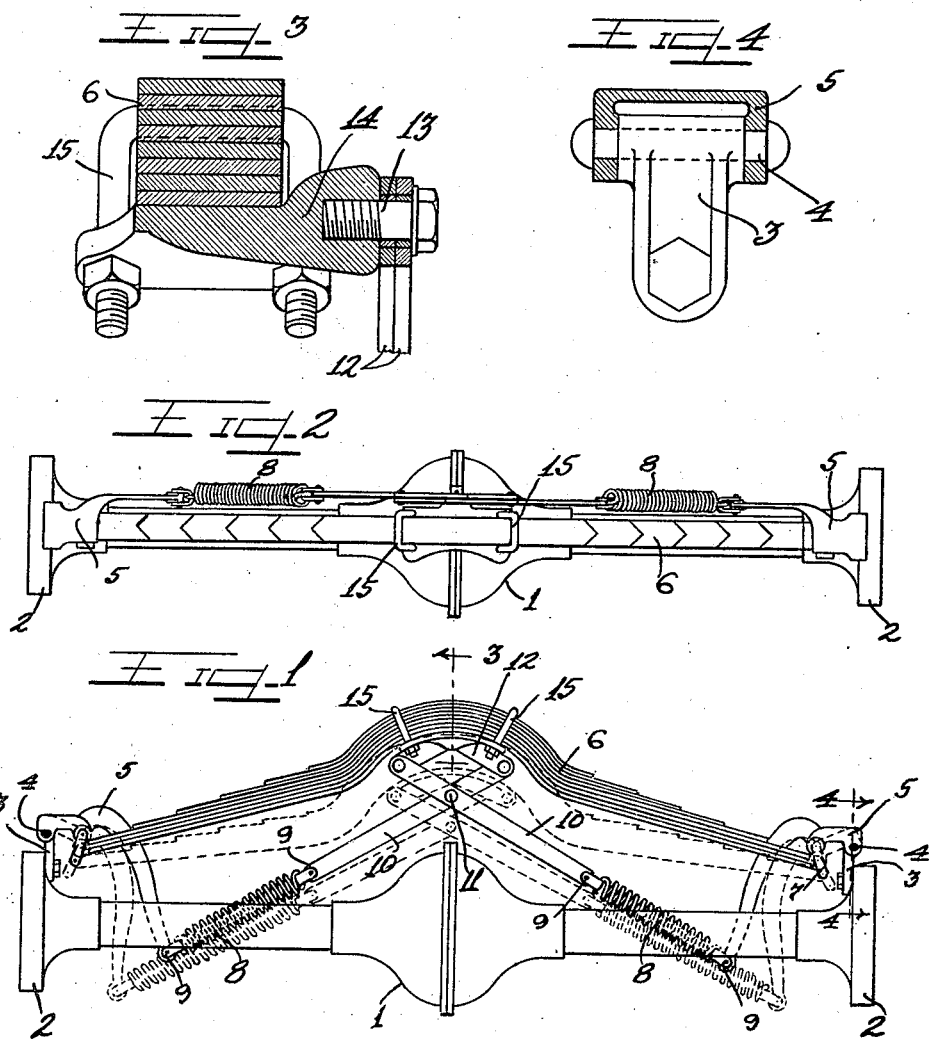

Patented Apr. 24, 1923.

1,453,061

UNITED STATES PATENT OFFICE.

EDWARD BRUNDIGE, OF CHICAGO, ILLINOIS.

VEHICLE SPRING.

Application filed February 2, 1922. Serial No. 533,572.

*To all whom it may concern:*

Be it known that I, EDWARD BRUNDIGE, a citizen of the United States, and a resident of the city of Chicago, in the county of Cook and State of Illinois, have invented certain new and useful Improvements in a Vehicle Spring; and I do hereby declare that the following is a full, clear, and exact description of the same, reference being had to the accompanying drawings and to the numerals of reference marked thereon, which form a part of this specification.

This invention relates to a yieldingly supported vehicle spring.

As a general rule, a vehicle spring is designed with reference to the maximum load that it is intended to support. When the load is light, say one-half of the maximum or less, there will be little tendency to flex the spring which will act more as a rigid body than a yielding member, and in consequence thereof, a great deal of jarring will result. This invention is designed to overcome these objections, and it is primarily an object of this invention to yieldingly support a vehicle spring so that there will be a yield independent of the vehicle spring.

It is a further object of this invention to provide novel means for yieldingly suspending a vehicle spring to avoid the jarring effect arising from supporting a light load.

With these and other objects in view which will become more apparent in the following description and disclosures, this invention comprises the novel mechanism and combinations hereinafter described and more particularly pointed out and defined in the appended claims.

In the accompanying drawings which illustrate a preferred embodiment of this invention and in which similar reference numerals refer to similar features in the different views, Figure 1 is an elevational view of the rear axle of a vehicle and spring with my invention applied thereto.

Figure 2 is a top plan view thereof.

Figure 3 is a section on the line 3—3 of Figure 1 upon an enlarged scale.

Figure 4 is a section on the line 4—4 of Figure 1 upon an enlarged scale.

In referring now to the drawings which illustrate one embodiment of this invention, the reference numeral 1 represents a vehicle axle, preferably the rear axle. The ends of the axle are provided with the usual brake drums 2 to which the vertical lugs 3 are secured in some appropriate way, as by bolting the same thereto. Pivots 4 are supported in the upper ends of these lugs which are provided with proper apertured bearings therefor. The pivots 4 extend beyond the ends of the lugs to afford pivotal supports for the bifurcated ends of the levers or supports 5 which curve and extend downwardly.

The vehicle spring 6 is supported at its ends in stirrups 7 which are pivoted to the levers or supports 5 intermediate the ends thereof, so that the load on the spring 6 will tend to swing the levers or supports 5 outwardly with the pivots 4 as axes. The levers or supports 5 are yieldingly restrained from thuswise swinging outwardly by means of coil springs 8 flexibly attached at their lower ends to the lower ends of the levers 5 by means of hook members 9 which swivel in apertures in the ends of the levers and have the springs attached thereto on axes at right angles to the axes of the apertures in the levers, whereby a form of gimbal joint is obtained. The upper ends of the springs 8 are flexibly anchored to similar hook members 9 which are attached to the lower ends of toggle links 10 on axes at right angles to the axes upon which the upper ends of the springs are attached to the hook members whereby a form of gimbal joint is provided. The toggle links 10 cross each other below the central part of the springs 6 and are pivoted together by the pivot 11. The upper ends of the links 10 are pivoted to short links 12 which are pivotally suspended from a common pivot 13 secured centrally of the spring 6 in a lug 14 attached to said spring 6 by means of the usual U-bolts 15.

*Operation.*

The foregoing described mechanism will operate as follows: If only a light load is supported on the main spring 6 so that there will be very little flexure thereof, if any, there will be a tendency of the levers 5 to pivot outwardly upon the pivots 4 as axes. This tendency will be resisted by the coil springs 8 which are of much less resistance than the spring 6. It is therefore evident that under light loads, the springs 8 act as the yielding medium for the load independently of the main spring. Under heavy loads which cause the spring 6 to flex, the springs 8 will act as auxiliary yielding means to yieldingly support the levers 5.

From the foregoing, it is apparent that the yielding medium will act so as to prevent the objectionable jarring so common in lightly built vehicles and will produce a substantially even and easy yield.

I am aware that many changes may be made, and numerous details of construction may be varied through a wide range without departing from the principles of this invention, and I therefore do not purpose limiting the patent granted, otherwise than necessitated by the prior art.

I claim as my invention:

1. In a vehicle, a pair of spaced supports, levers pivoted at one end to said supports, a leaf spring having its ends attached to intermediate points of said levers, coil springs attached to the free ends of said levers, and toggle links connecting said coil springs with the central part of said leaf spring.

2. The combination with a vehicle suspension spring and the supporting axle, of levers pivoted to said axle and connected intermediate their ends to the ends of the suspension spring, a pair of short links pivoted upon a common pivot centrally of said spring, a pair of long links pivoted to the ends of said short links, and pivoted together intermediate their ends, and springs connecting the free ends of said long links to the free ends of said levers.

In testimony whereof I have hereunto subscribed my name in the presence of two subscribing witnesses.

EDWARD BRUNDIGE.

Witnesses:
CARLTON HILL,
H. H. FASNACHT.